March 29, 1955   C. G. YATES, JR., ET AL   2,705,116
AIRCRAFT CONTROL APPARATUS
Filed Nov. 14, 1951   3 Sheets-Sheet 1

Inventors:
Charles G. Yates, Jr.
Frank A. Gaynor,
by Richard E. Hesley
Their Attorney.

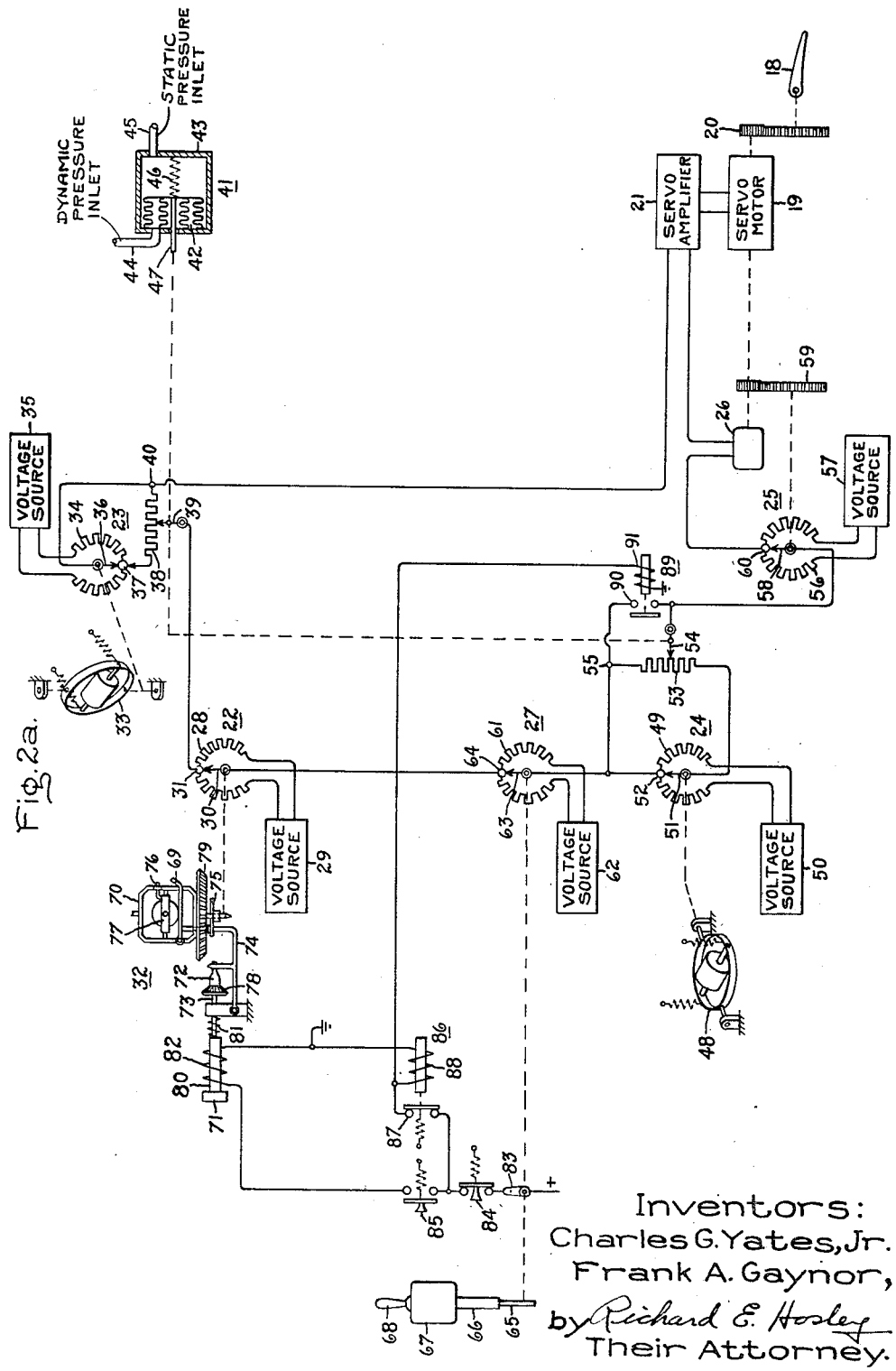

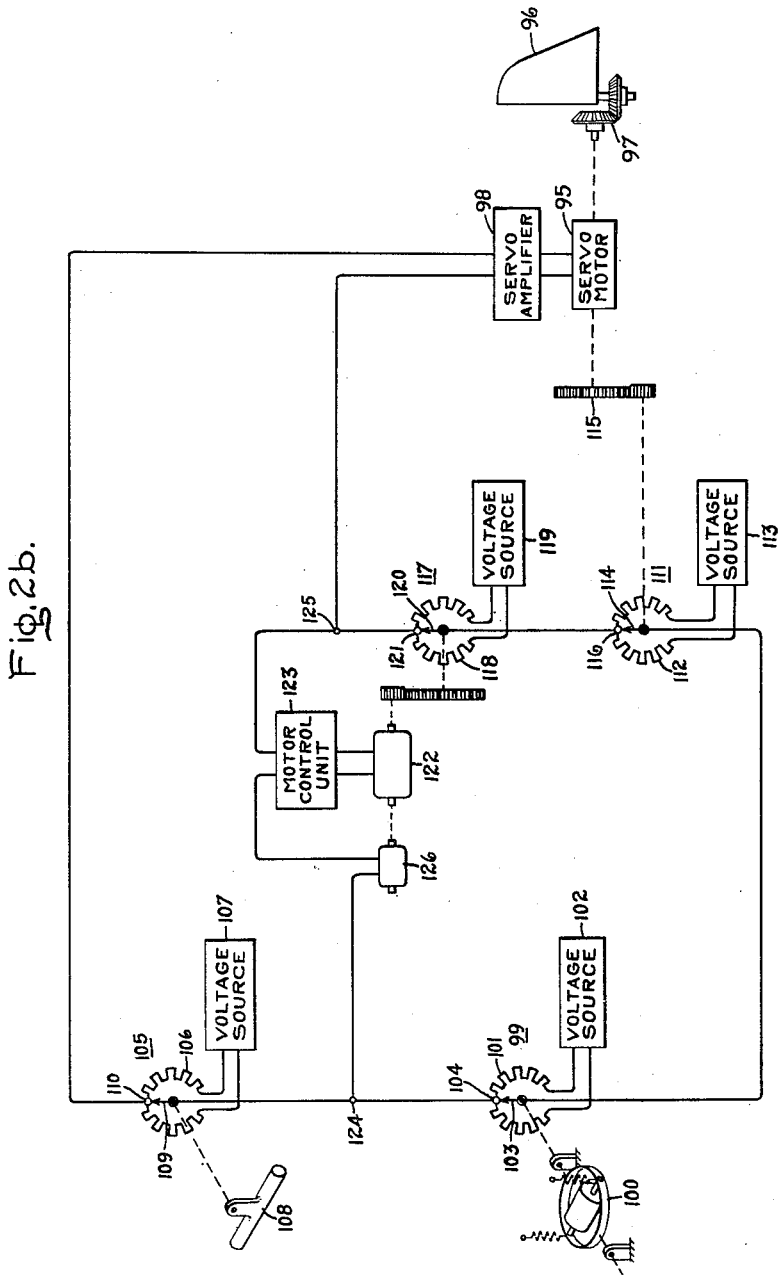

United States Patent Office 2,705,116
Patented Mar. 29, 1955

2,705,116

AIRCRAFT CONTROL APPARATUS

Charles G. Yates, Jr., and Frank A. Gaynor, Schenectady, N. Y., assignors to General Electric Company, a corporation of New York Application November 14, 1951, Serial No. 256,168

31 Claims. (Cl. 244—77)

This invention relates to automatic control apparatus for aircraft, and more particularly to such apparatus for controlling the attitude of an aircraft relative to its longitudinal, i. e. roll, and vertical, i. e. yaw, axes.

In the design of control apparatus for aircraft, there are two principal factors which must be considered, firstly, the standard of performance necessary from the apparatus, and secondly, the weight the apparatus adds to the aircraft. Since each pound of control apparatus subtracts from the "pay load" of the aircraft, it is desirable that the apparatus weight be kept as low as possible. However, for safety reasons, the performance of the apparatus cannot be sacrificed in order to save weight. This is particularly true of automatic pilot apparatus which moves one or more of the control surfaces of the aircraft so as to stabilize or control it in flight.

Ordinarily, automatic pilots contain three control channels or circuits, each for controlling the attitude of the aircraft relative to a different axis thereof. Since these channels are electrically separate, a weight saving may be effected in one without adversely affecting the performance of the other two. Thus, heretofore, there have been various attempts to provide lightweight control channels of all three types, aileron, elevator, and rudder. These attempts, however, have resulted in poorer performance apparatus requiring the human pilot to trim the aircraft at frequent intervals in order to maintain the aircraft at the desired attitude. Since they require this constant monitoring, these reduced channels actually do not accomplish the primary purpose of autopilots, which is, of course, to provide substantially complete relief for the human pilot. In other words, the reduced weight channels do not produce the very close control required from relief autopilots.

The conventional, high performance relief autopilots are, however, of a greater weight than can be tolerated on the latest high speed aircraft. Consequently, there presently exists a great need for control channels of the various types, which combine both light weight and high performance.

It is, therefore, a principal object of our invention to provide new and improved light weight high performance automatic pilot equipment.

It is a more specific object of our invention to provide new and improved automatic pilot equipment for controlling the attitude of an aircraft relative to its longitudinal or roll axis.

It is another object of our invention to provide new and improved automatic pilot equipment for maintaining an aircraft in a predetermined direction of flight.

It is another object of our invention to provide a new and improved autopilot aileron control channel.

It is still another object of our invention to provide an aileron control channel in which the need for a vertical gyro is obviated.

It is a further object of our invention to provide a light weight aileron control channel including means for maneuvering the aircraft.

It is still a further object of our invention to provide an improved maneuvering aileron control channel which in combination with an interdependent rudder channel automatically accomplishes coordinated turning of an aircraft upon manual actuation by the human pilot, no matter what the degree of actuation may be.

In carrying out our invention in one form thereof, we utilize direction of flight responsive signal generating means, yaw rate responsive signal generating means, roll rate responsive signal generating means, and aileron position follow-up signal generating means to form a new and improved autopilot aileron control channel. The channel controls the ailerons by combining the various signals to actuate aileron positioning means, such as, for example, a servomotor. The channel is intended for use with an interdependent rudder channel of the type including signal generating means responsive to the deviation of the apparent vertical of the craft from the true vertical thereof, and through aerodynamic cooperation with such a rudder channel stabilizes the aircraft about its roll axis. The cooperating action between the two channels also maintains the aircraft in the desired direction of flight. Since none of its signal-producing means requires a vertical gyro, this new aileron channel is considerably lighter than conventional high performance aileron channels in which a vertical gyro controlled source is needed for satisfactory, i. e. stable, performance.

If a maneuvering autopilot is desired, we also include in the aileron channel maneuvering control means comprising a manually controlled signal source. In order to prevent the direction of flight responsive means, and the yaw rate responsive means from opposing maneuvering of the aircraft, the manually controlled source is interlocked with means which disable those signal producing means during the maneuvering. Due to the interdependent relation between the aileron and rudder channels, the introduction of a signal from the maneuvering source into the aileron channel then results in a coordinated turning of the aircraft about its vertical axis.

The features of our invention which are believed to be novel and patentable are pointed out with particularity in the appended claims. The invention, itself, however, both as to organization and mode of operation, together with additional objects and advantages thereof, may be best understood by reference to the following description taken in conjunction with the accompanying drawing in which:

Fig. 1b is a simplified schematic diagram in block form of an autopilot rudder control channel suitable for interdependent action with the aileron channel of Fig. 1a;

Fig. 2a is a diagrammatic representation of a maneuvering autopilot aileron control channel embodying our invention and showing the components of Fig. 1a in greater detail, and Fig. 2b is a diagrammatic representation of a rudder control channel showing in detail the features of the channel of Fig. 1b and suitable for interdependent action with the maneuvering aileron control channel of Fig. 2a.

Figure 1A:
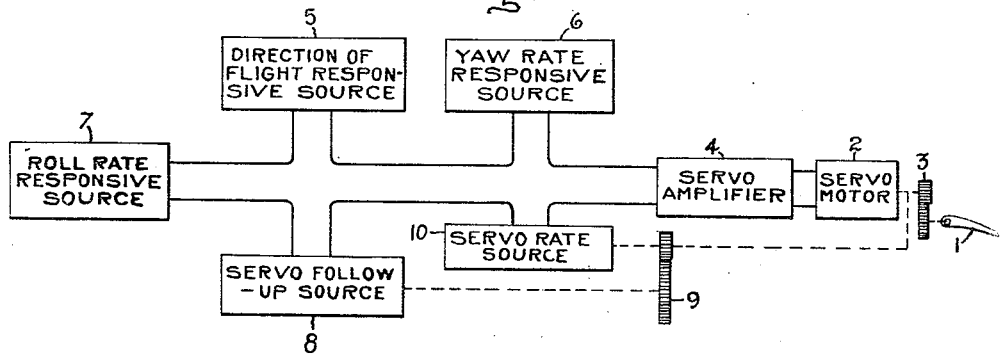
Fig. 1a is a simplified schematic diagram in block form of an autopilot aileron control channel embodying our invention in one form.
Figure 1B:
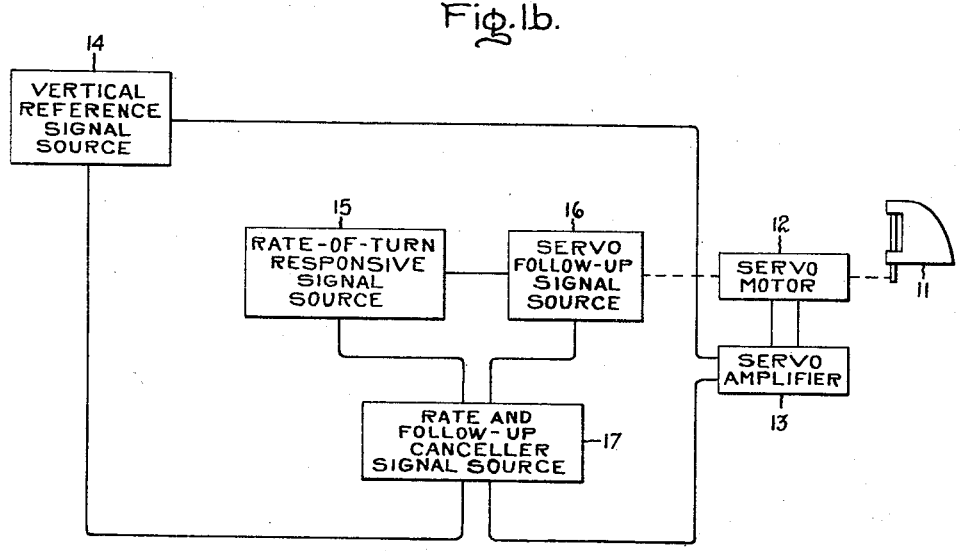

Referring to Figs. 1a and 1b we have shown therein new and improved interdependent autopilot means both for stabilizing an aircraft (not shown) about its roll axis and for maintaining it in a predetermined direction of flight. The new and improved light weight aileron control channel shown in Fig. 1a embodies our invention in one form thereof and may be used with various interdependent rudder channels. The rudder channel shown in Fig. 1b is, however, particularly well adapted for employment with our aileron channel. Such a rudder channel is fully described and claimed in the copending application of Charles G. Yates, Jr., Serial No. 240,384, filed August 4, 1951 and assigned to the same assignee as the present application.

Referring now specifically to Fig. 1a, we connect the ailerons 1 of an aircraft to a servomotor 2 through gears 3 so that the ailerons may be displaced in either direction from a neutral or null position in response to movements of the servomotor in either direction from a corresponding null position. The servomotor 2 is actuated through a servo amplifier 4 which itself is energized by a circuit including a plurality of signal sources connected in series circuit relation.

A first of these signal sources 5 produces a control signal in response to any azimuth deviation of the aircraft from the direction of flight which it is desired to have the autopilot maintain. The magnitude of the signal produced by source 5 is proportional to the magnitude of the deviation from the desired course while the polarity of the signal is dependent upon the direction of the deviation. An example of an attitude maintaining instrument which might be used to control source 5 is a conventional directional gyro. Another two of the signal sources 6 and 7 are responsive respectively to the separate rates of movement of the aircraft about its vertical and longitudinal axes. The yaw rate responsive source 6 produces a signal variable in magnitude and polarity with the rate and direction of movement of the aircraft about its vertical or turn axis and the roll rate responsive source 7 produces a signal variable in magnitude and polarity with the rate and direction of movement of the aircraft about its longitudinal or roll axis. Yaw rate and roll rate sources 6 and 7 may be controlled by any rate of angular movement responsive devices, for example, spring loaded yaw rate and roll rate gyros respectively.

Sources 5, 6 and 7 provide the primary signals for stabilizing the aircraft about its roll axis, but in order to prevent hunting of the craft about the axis servo position follow-up or repeat back means are also included in the circuit. Thus, a follow-up signal source 8 connected to servomotor 2 through gears 9 produces a signal proportional to the displacement of the ailerons from a predetermined neutral position, and a servo rate source or tachometer 10 direct-connected to the servomotor produces a signal proportional to the rate of movement of the ailerons. The signal from follow-up source 8 is always of a polarity to return the elevators to their neutral position, while the signal from tachometer 10 is always of a polarity to oppose movement of the ailerons either away from or toward the neutral position.

In order to stabilize the aircraft about its roll axis our new and improved aileron channel requires the cooperation of an interdependent rudder control channel, such as is illustrated in Fig. 1b. It should be understood, however, that our invention is not limited to the particular rudder channel shown in Fig. 1b since, as previously mentioned, various other interdependent rudder channels may be used with satisfactory results. In fact, we include this rudder channel in the drawing and description only in order that the operation of our aileron channel may be more completely understood. The operation of the rudder channel is itself fully explained in the aforesaid Yates application Serial No. 240,384.

As shown in the diagram, the rudder channel accomplishes positioning of the aircraft rudder 11 by means of a servomotor 12. The servomotor 12 is actuated from a servo amplifier 13 which is itself connected to be energized from a circuit including in series circuit relation a signal source 14 responsive to deviation of the vertical axis of the aircraft from the apparent vertical axis, a rate of turn responsive signal source 15 and a servo follow-up signal source 16. The vertical reference source 14 produces a signal variable in magnitude and polarity with the amount and direction of the deviation of the vertical axis of the aircraft from the apparent vertical (i. e., the resultant of gravitational and acceleration forces), and it may be controlled by various devices including acceleration responsive means, such as a pendulum. The rate of turn responsive source 15 produces a signal variable in magnitude and polarity with the rate and direction of the movement of the aircraft about its vertical or turn axis, and it may be controlled by any rate of turn responsive device, for example, a spring-loaded yaw rate gyro. The follow-up source 16, however, is controlled by the position of the rudder rather than by a function of the craft attitude, and it is included in the circuit in order to prevent hunting of rudder 11 as would occur if amplifier 13 were supplied only with signals from sources 14 and 15. The output from source 16 is proportional to the displacement of rudder 11 from a null position and is always of a polarity to return the rudder to the null position.

Besides sources 14, 15, and 16, the servo actuating circuit also includes a time element responsive rate and follow-up canceler source 17 which is controlled by the outputs of rate of turn responsive source 15 and follow-up source 16. Rate and follow-up canceler 17, which may be any known time element canceler device such as the preferred one of which is more fully discussed hereinafter, produces an output signal in response to any steady-state or substantially steady-state, i. e., non-transient, signal from sources 15 and 16 but does not produce any output signal in response to non-steady-state, i. e., transient, signals from sources 15 and 16. The output signal produced by rate and follow-up canceler 17 in response to steady-state rate and follow-up signals is substantially equal and opposite to those signals, and the canceler output is connected in the system in series circuit relation so that this output signal opposes the rate and follow-up signals. In other words, when sources 15 and 16 are producing a steady-state or substantially steady-state signals, source 17 produces an equal and opposite nullifying signal causing the servo 12 to be controlled by the vertical reference signal source 14 alone.

It has been stated, hereinbefore, that our new and improved aileron channel cooperates with this rudder channel both to stabilize the aircraft about its roll axis and to maintain the aircraft in a desired direction of flight. This cooperation is secured through aerodynamic relationships for, as is obvious from the diagram, the two channels are electrically separate. In other words, the one channel actuates the other channel by changing the craft attitude relative to the desired attitude which the second channel is set to maintain.

Whenever the aircraft begins to move about the roll axis, i. e., deviate from the desired attitude relative to the roll axis, a signal is thereupon introduced into both channels. The roll rate responsive source 7 introduces a signal into the aileron channel proportional to the rate at which the aircraft is moving about the roll axis, and the vertical reference signal source 14 introduces a signal into the rudder channel proportional to the magnitude of deviation of the craft from the desired attitude. The signal from roll rate source 7, of course, displaces the ailerons so as to oppose the movement of the aircraft. The signal from vertical reference source 14, however, causes a displacement of the rudder so as to change the direction of flight of the aircraft. As the aircraft begins to deviate from the desired direction of flight, its movement results in the direction of flight responsive source 5 and the yaw-rate responsive source 6 also introducing signals into the aileron channel. These signals from sources 5 and 6 aid the signal from source 7 so that the ailerons are displaced from their neutral position sufficiently to return the aircraft to the desired attitude relative to the roll axis, the desired attitude normally being the level flight position. The servo follow-up 8 and the servo tachometer 10 introduce signals in the aileron channel opposing the actuating signals from sources 5, 6, and 7 and thereby prevent a greater displacement of the ailerons than is necessary to return the aircraft to level flight. This, of course, is desirable in order to forestall hunting of the aircraft about the level flight attitude. As the aircraft begins to return to the level flight position, the signal from the servo follow-up becomes greater than the signals from the various attitude and attitude rate responsive sources and thereupon actuates motor 2 to move in the reverse direction so as to return ailerons 1 to their neutral position. Actually, due to the change in direction of the rolling movement, the signal from roll rate source 7 reverses in polarity and aids in moving the ailerons back to their neutral position. However, once the direction of movement of the ailerons is reversed, the signal from tachometer 10 reverses and opposes the follow-up signal. But this is desired in order to prevent the ailerons from returning too rapidly to their neutral position. In fact, if the aircraft did not deviate from the desired direction of flight due to the above rudder displacement, the action of servo follow-up 8 and servo tachometer 10 would be that the ailerons would be returned to their neutral position substantially at the same time as the aircraft returns to the level flight position.

Of course, since the rolling of the aircraft also resulted in a change in the direction of flight of the aircraft because of the signal from vertical reference source 14, the aircraft is ordinarily slightly off course when it is first returned to the level flight position. If such a condition exists, the ailerons do not return to their null position by the time the aircraft reaches the level flight position because the direction of flight responsive source 5 is still introducing a signal into the aileron channel. This causes the aircraft to move a slight amount about the roll axis in the opposite direction and causes source 14 to produce a signal in the rudder channel opposite to the signal it originally produced. This causes a movement of the rudder and returns the aircraft to the desired direction of flight. As the aircraft returns to the correct direction of flight, the signal from source 5, of course, becomes smaller whereupon the follow-up signal from source 8 returns the ailerons to the neutral position substantially at the same time as the aircraft returns to the correct direction of flight. The follow-up source 16 also returns rudder 11 to its neutral position at that time so that the aircraft is thus returned to level flight and to the correct source at the same time.

The above sequence of operation occurs if there is a large deviation of the aircraft about the roll axis. However, when there is only a short or transient tendency for the aircraft to move about the roll axis, the signal from source 7 may be sufficient in itself to displace ailerons 1 enough to overcome this tendency. In other words, if the movement about the roll axis is very small, the rudder channel may not be actuated at all. In the above-described sequence of operations for a large deviation about the roll axis, the rudder channel caused a change in the attitude of the craft relative to the vertical axis which thereupon aerodynamically caused the aileron channel to effect a change in the attitude of the craft relative to the roll axis. As was pointed out, if the aircraft is off course when it returns to the correct roll attitude, the aileron channel then causes a change in the roll attitude resulting in a rudder movement causing a return of the aircraft to the correct heading. Such a sequence also occurs if the craft is blown off course while still maintaining a level flight position. In other words, no matter whether the craft moves around the roll axis from the level flight position or moves about the vertical axis from the correct direction of flight, the aileron and rudder channels cooperate to return the craft to level flight in the correct direction.

In order to form a complete autopilot, an elevator channel is also required. Our new and improved aileron control channel may be used with any elevator control channel which is electrically and aerodynamically independent of the accompanying aileron and rudder channels. However, since a great advantage of our new aileron channel is the omission of the heretofore conventional vertical gyro, it is preferable that it be used with an elevator channel which also does not require a vertical gyro. A preferred one of such channels is described and claimed in the co-pending application of Charles G. Yates, Jr. for "Automatic Pilot Equipment," Serial No. 256,167 filed November 14, 1951 and assigned to the same assignee as the present application.

Referring now to Figs. 2a and 2b, we have shown therein an improved autopilot aileron and rudder control system in which maneuvering control means are included. Through their cooperating action, the two channels illustrated therein provide means for maintaining and stabilizing an aircraft in any predetermined direction of flight with the wings level about the roll axis, and also provide means for maneuvering the craft through a coordinated turning action. The rudder channel illustrated in Fig. 2b is only, however, illustrative of various rudder channels which may be employed with the embodiment of our invention shown in Fig. 2a. It should be understood that our invention is not limited to use with the particular type rudder channel shown in Fig. 1b, which rudder channel is described and claimed in the aforesaid Yates application, Serial No. 240,384.

Referring now to Fig. 2a, we have shown therein a control surface 18 which represents the aileron control of an aircraft (not shown) for controlling the movements of the aircraft about its roll axis. In order to position ailerons 18, we provide servo means, such as a reversible servomotor 19 which is connected to ailerons 18 through gears 20; and we energize these servo means from a servo amplifier 21 which itself is actuated from a circuit including a plurality of signal sources 22, 23, 24, 25, 26 and 27. These sources are connected in series circuit relation so that resultant signal applied to amplifier 21 is the algebraic summation of their individual outputs. The servomotor responds in direction to the polarity of the output signal from the servo amplifier, and its speed is a function of the signal intensity.

A first of the signal sources 22 includes a potentiometer 28 which is connected across a voltage source 29 and has a wiper arm 30 movable in either direction along the potentiometer from coincidence with a fixed midtap 31. The output from source 22 is taken across arm 30 and tap 31 and thus varies in magnitude and polarity with the extent and direction of movement of the arm from coincidence with the tap. The wiper arm 30 is connected for rotation with the vertical gimbal ring of a conventional directional gyro 32 and thus the signals derived between arm 30 and tap 31 indicate the azimuth deviation of the aircraft from a desired heading. As is well known in the art, the directional gyro 32 is mounted in a pair of gimbal rings for three degrees of freedom.

A second of the signal sources 23 is controlled by a spring loaded roll rate gyro 33, the spin axis of which preferably lies parallel to the transverse or pitch axis of the plane and the gimbal axis of which lies along the vertical axis of the plane. Source 23 includes a potentiometer 34 which is connected across a voltage source 35 and has a wiper arm 36 movable in either direction from a fixed tap 37. The wiper arm 36 is coupled to the roll rate gyro 33 so that the signal appearing between arm 36 and tap 37 is indicative in polarity and magnitude of the direction and rate of movement of the craft about its roll axis.

Since the reaction of some high speed aircraft to a predetermined aileron movement thereof varies at different air speeds, it is desirable that the aileron movement for a certain rate of craft movement around the roll axis vary from one air speed to another. Thus, we have optionally included in source 23 means for correcting the signal obtained from potentiometer 34 according to the speed of the aircraft. More specifically, we have provided a gain changer which adjusts the gain, i. e., the magnitude, of the output signal of potentiometer 34 as a function of the indicated air speed. This gain adjustment aids in keeping the aileron channel stable throughout the entire speed range of the aircraft. We have illustrated the gain changer schematically as a second potentiometer 38 across which the signal from potentiometer 34 is applied. The output signal of this second potentiometer 38, which signal actually comprises the output of roll rate-responsive source 23, is taken between a wiper arm 39 movable along potentiometer 38 in either direction from a predetermined point thereon and an end tap 40 of the potentiometer.

In order to accomplish the speed correction function, the position of wiper arm 39 is controlled by an air speed measuring device such as the pressure responsive device 41. As shown schematically, device 41 contains an expansible bellows 42 positioned within an outer casing member 43. The bellows 42 is supplied through an inlet line 44 with air at the dynamic pressure including both the apparent static pressure at any altitude and the velocity head due to the speed of movement of the aircraft, while the casing member 43 is supplied through an inlet line 45 with air at the apparent static pressure of the altitude. The expansion of the bellows against a force of a restraining spring 46 is then proportional to the velocity head and thus to the speed of movement of the aircraft. The output shaft 47 of the device is arranged to be moved in and out by the expansion and contraction of the bellows and is coupled mechanically to wiper arm 39 so as to control its position along potentiometer 38. Thus, as arm 39 is moved along potentiometer 38, in one direction or the other in response to changes in aircraft speed, more or less of the applied signal from potentiometer 34 is derived between arm 39 and end tap 40. In other words, potentiometer 38 adjusts the output of potentiometer 34 as a function of indicated air speed. More specifically, the output signal of potentiometer 34 is progressively attenuated as air speed increases. As mentioned above, the adjusted or corrected signal obtained between arm 39 and tap 40 comprises the output of source 23, which is fed into the servo actuating circuit.

In addition to the roll rate signal from source 23 and the azimuth deviation signal from source 22, there is also introduced in the servo circuit a signal responsive to the rate of movement of the aircraft about its vertical or yaw axis, i. e., a yaw rate responsive signal. This signal is supplied from the signal source 24 which is controlled by any yaw rate-responsive device, such as the spring loaded yaw rate gyro 48 having its gimbal axis parallel to the longitudinal axis of the craft and its spin axis lying along the pitch axis of the craft. As shown, source 24 includes a potentiometer 49 which is connected across a voltage source 50 and has a wiper arm 51 movable in either direction from coincidence with a fixed mid-tap 52. The wiper arm 51 is connected to be moved by yaw rate gyro 48 and thus the output signal which is derived between arm 51 and tap 52 is dependent respectively in magnitude and polarity upon the rate of yaw and direction of yaw of the aircraft, or, in other words, is yaw rate responsive.

For best results from aileron channel, this signal should also be adjusted as a function of the speed of the aircraft. Thus, a gain changer potentiometer 53 is connected across arm 51 and tap 52 and the output signal of source 24 is taken between a wiper arm 54 and one end tap 55 of potentiometer 53. Wiper arm 54 is coupled to speed responsive device 41 and is movable in either direction along the potentiometer. Its resulting movement in one direction or the other, depending upon whether the aircraft speed increases or decreases, attenuates the output signal of potentiometer 49 as the aircraft speed increases. In other words, the action of potentiometer 53 results in source 24 supplying a yaw rate responsive signal in the aileron control channel, which is of the correct magnitude for system stability at the various air speeds.

In order to prevent hunting of the aileron control surface in response to these various control signals, it is necessary that some aileron position follow-up or repeat back signal be introduced in the circuit. Such a signal is here obtained from the signal source 25 which includes a potentiometer 56 connected across a voltage source 57. The potentiometer wiper arm 58 is mechanically actuated by aileron servo 19 through gears 59 so that its movement corresponds to those of aileron control surface 18; and the follow-up signal output appearing between wiper arm 58 and a fixed mid-tap 60 on potentiometer 56 is variable in magnitude and polarity dependent upon the extent and direction of the movement of wiper arm 58 from coincidence with tap 60.

Follow-up signal voltage source 25 is connected in the servo circuit to oppose the control signals causing displacement of aileron control surface 18. In other words, as ailerons 18 are displaced from their neutral, i. e., normal, position in response to any signal or combination of signals from the aforesaid control signal producing means 22, 23, and 24, source 25 produces a signal tending to return ailerons 18 to the neutral position.

Since there is a slight tendency for the follow-up itself to cause a minor hunting of the aileron servo 19, there is also connected in the circuit the signal source 26 which produces a signal proportional to the rate of movement of the aileron servo. This signal source 26 comprises a tachometer generator which is driven by the servo 19. Tachometer 26 has an output voltage proportional to its speed and is connected so that its output always opposes the actuating signal causing movement of servo 19, and it thereby prevents servo 19 and thus ailerons 18 from moving past their null positions due to rotational inertia. Although tachometer 26 thus improves the operation of the channel, its omission therefrom does not render the channel unstable and it should be understood that we contemplate such an omission among the modifications of the illustrated channel.

As actuated by the signals from azimuth deviation responsive source 22, the roll rate responsive source 23, the yaw rate responsive source 24, the follow-up source 25 and the servo rate responsive source 26, the servo 19 moves ailerons 18 so as to maintain the aircraft in level flight, as will be more fully explained hereinafter. However, in order to provide means for maneuvering the aircraft while it is under autopilot control, there is also connected in the servo circuit a maneuvering control means comprising the aforesaid signal generator or source 27.

Signal source 27 comprises a potentiometer 61 which is connected across a voltage source 62 and has a wiper arm 63 movable in either direction from a fixed mid-tap 64, the output signal of source 27 being taken between arm 63 and tap 64 and thus being dependent in polarity and magnitude on the displacement of arm 63 from tap 64. The position of arm 63 is determined by the position of a rotatable shaft 65 to which it is connected. This rotatable shaft 65 preferably comprises one of the two concentric output shafts 65 and 66 of a mechanically operated "joy stick" actuator 67 such as is described and claimed in the copending application of Barton H. Snow for "Motion Translating Device," Serial No. 245,283, filed September 6, 1951, now Patent No. 2,610,520 and assigned to the same assignee as the present invention.

Actuator 67 is operated by a lever or "joy stick" 68 which is mounted in universal pivots therein, and the actuator translates the motion of the "joy stick" into rotational movement of the two output shafts 65 and 66. The actuator 67 has a null or neutral position, i. e., a center position of stick 68, as is shown in the diagram, from which the stick may be displaced in any direction, and each output shaft has a corresponding neutral position from which it may be rotated in either direction.

Actuator 67 is so constructed that one rotatable output shaft is moved in response to movements of lever 68 in a predetermined direction or to any component of lever movement lying in that direction, whereas the other output shaft is responsive to any lever movement or any component thereof lying at right angles to the above predetermined direction. In other words, the displacements of shafts 65 and 66 from their illustrated null position are responsive respectively to separate components of the displacement of lever 68 from its null position, which components lie at right angles to each other. Thus in the illustrated system shaft 66 is responsive to components of "joy stick" movement perpendicular to the plane of the drawing, whereas shaft 65 is responsive to components parallel to the plane of the drawing.

When shaft 65 is in its neutral position, wiper arm 63 contacts tap 64 so that source 27 does not produce a signal. However, when shaft 65 is displaced in either direction from its neutral position by means of lever 68, arm 63 is moved away from tap 64 and a maneuvering control or bias signal is thereupon introduced into the aileron servo control circuit. The extent and direction of displacement of arm 63, of course, determines the magnitude and polarity of this signal.

In order for this signal to cause a change in the aileron position and thereby in the craft attitude, it is necessary that the azimuth deviation responsive source 22 and the yaw rate responsive source 24 be prevented from producing any signals, i. e., be rendered inoperative or disabled. Otherwise, these sources would introduce signals into the servo circuit opposing the desired maneuvering of the craft. To accomplish this disabling function, there is provided an automatic interlock system which positionally locks or cages the directional gyro 32 and places a short circuit across signal source 24. The caging of directional gyro 32 returns arm 30 to coincidence with tap 31 so that in effect source 22 is also shorted out.

Another reason that the directional gyro must be caged during the turn is that otherwise it would return the aircraft to the original heading after the turn. In other words, it is necessary to cage the directional gyro 32 during the turn so as to change its azimuth heading as well as that of the aircraft. To accomplish this caging and course-setting function, there is shown in schematic form a known arrangement comprising a caging arm 69, one end of which is pivotally mounted on the vertical gimbal ring 70 of gyro 23. When a knob 71 is pushed inwardly, a cam 72 mounted on a shaft 73 causes a link 74, a disk 75, and caging arm 69 to move upwardly whereupon a forked end of the caging arm 69 engages a pin 76 connected to inner gimbal 77 so as to lock the gyro in a well-known manner. Inward movement of knob 71 and the shaft 73 also causes a pinion 78 to engage a ring gear 79 coupled to the outer gimbal 70 so that by rotation of knob 71, the gyro assembly can be rotated about the vertical axis of gimbal ring 70 to set a desired course.

In order to provide means for automatically caging the directional gyro in response to the movement of lever 68 and thus of arm 63 from their neutral positions, we have shown schematically an actuating solenoid armature 80 which may be connected to, or form a part of it, the caging mechanism as shown. When armature or plunger 80 is moved inwardly, it displaces the caging mechanism so as to effect a caging of the gyro and thus a re-centering of arm 28, whereas when it is moved outwardly to the position illustrated, it displaces the caging mechanism in the opposite direction so as to uncage the gyro. The plunger 80 is biased by a spring 81 to the caged position, but it is electromagnetically moved therefrom to the uncaged position upon the energization of a solenoid winding 82.

To energize winding 82, there is employed the aforesaid interlocking or disabling system. This system or circuit is so constructed that coil 82 is de-energized, and thus the directional gyro caged, only when a maneuvering control signal is introduced into the circuit. At all other times coil 82 is continuously energized to keep the gyro uncaged. The system itself is energized from a grounded D. C. power supply and includes in series circuit relation between the two sides of the supply the solenoid coil 82 and a plurality of switches 83, 84, and 85. The circuit also includes a relay 86 whose normally open spring biased contacts 87 are connected in parallel with switch 85 and whose operating coil 88 is connected in parallel with coil 82. Relay 86 is shown in the diagram in its picked-up or operated position.

In order for coil 82 to be energized, either switch 85 or contacts 87 and both of switches 83 and 84 must be closed. Switches 84 and 85 are manually operable and spring biased respectively to normally closed and normally open positions. Switch 83, however, is controlled by the position of shaft 60. The movable member of switch 83 is mounted on the linkage connecting shaft 65 and arm 63 and switch 83 is closed only when shaft 65 and thus arm 63 are in their null positions. Whenever "joy stick" 68 is moved so as to displace arm 63, switch 83 is automatically opened.

Since switch 83 is connected directly to the positive side of the power supply, its opening de-energizes the entire interlock circuit including coil 82 and thus allows spring 81 to move plunger 80 inwardly to cage the directional gyro. In other words, whenever arm 63 is moved from coincidence with tap 64 for the purpose of introducing a maneuvering control signal into the aileron control channel, the interlock system automatically causes a caging of the directional gyro 32 and thereby a disabling of the azimuth deviation responsive source 22.

Moreover, directional gyro 32 is not automatically uncaged when stick 62 is brought back to its neutral position. Rather, since contacts 87 are open, the interlock system keeps source 22 disabled until switch 85 is manually closed by the human pilot. However, once switch 85 is closed, relay 86 picks up closing contacts 87 and locking in the circuit. This feature requiring the pilot to consciously uncage the directional gyro, when he has completed the maneuvering of the aircraft, is provided to prevent an automatic momentary uncaging thereof whenever shaft 65 passes through its neutral position. In maneuvering the aircraft from one course to another, the pilot might very well operate the "joy stick" 68 so as to move shaft 65 and arm 63 through their neutral positions one or more times before he manages to maneuver the aircraft to the new heading. It would obviously be undesirable to momentarily uncage the gyro each time that shaft 65 passed through its neutral position.

This gyro caging or disabling feature secured by the opening of switch 83 can also be obtained by opening switch 84. In fact, the purpose of switch 84 is to allow the human pilot to disable the sources 22 and 24 without operating the "joy stick" 68. It should be noted, incidentally, that the directional gyro should be caged so as to disable source 22 whenever the craft is switched from manual control (not shown) to the autopilot control.

The means controlled by the interlock system for disabling source 24 comprises the relay 89 whose normally closed contacts 90 are connected across the output terminals of the source, i. e., across arm 39 and tap 40 of potentiometer 38. The contacts 90 are shown, however, in the picked-up or operated position. The relay operating coil 92 is connected in parallel with coils 82 and 88 and hence is energized and de-energized at the same times as those coils. Thus, whenever switch 83 is opened, the relay drops out closing contacts 90 and thereby shorting out source 24. As with the gyro caging solenoid coil 82, the relay operating coil 91 cannot be re-energized until both switches 83 and 85 are closed. Thus the disabling short on sources 24 are locked on until the human pilot consciously recloses switch 85 after completing maneuvering of the aircraft.

In operation, our new and improved aileron channel cooperates with an aerodynamically interdependent rudder channel, such as that illustrated in Fig. 2b, both to stabilize the aircraft about its roll axis and to maintain it in a desired direction of flight. In Fig. 2b, we have shown a preferred rudder control channel for use with our new and improved aileron channel, which preferred rudder channel is of the type disclosed in the aforesaid Yates application Serial No. 240,384. This rudder channel maneuvers the aircraft relative to its vertical axis by means of a servomotor 95 which drives a rudder 96 through gears 97. Motor 95 is energized from a servo amplifier 98 in response to the signals supplied from a plurality of signal sources which are connected in series circuit relation with each othr. The first of these signal sources 99 is controlled by a rate-of-turn responsive device, such as the rate of turn, i. e., yaw rate, gyroscope 100 and comprises a potentiometer 101 connected across a voltage source 102. The potentiometer wiper arm 103 is coupled for rotation with the gimbal of gyro 100 and the rate of turn output signals of the source are derived between wiper arm 103 and a fixed tap point 104 on the potentiometer. These output signals vary respectively in polarity and magnitude in accordance with the direction of turn and rate of turn of the aircraft about its vertical or turn axis.

A second signal source 105 comprising a potentiometer 106 connected across a voltage source 107 is controlled by the movement of a gravitational and centrifugal acceleration responsive device, such as the pendulum 108. Pendulum 108 is mounted in the aircraft for pivotal movement about an axis parallel to or coincident with the longitudinal or roll axis of the aircraft and thereby is responsive not only to gravitational acceleration but also to centrifugal acceleration during turning of the aircraft. Coupled for movement with pendulum 108 which may, if desired, be damped, as by a dashpot, is a potentiometer wiper arm 109. The wiper arm is movable along potentiometer 106 on either side of a fixed mid-tap 110 and the output of source 105 is taken between wiper arm 109 and tap 110. In normal straight flight, and in a coordinated turn where the apparent vertical (i. e., the resultant of gravitational and acceleration forces) coincides with the vertical axis of the craft, pendulum 108 remains in its null position with wiper arm 109 contacting tap 110. However, whenever the aircraft is banked while in straight flight or whenever the angle of bank is too shallow or too steep for the arcuate path the aircraft is following in a turn, pendulum 108 moves off its null position to introduce a corrective signal into the servo circuit. The corrective signal in either case moves the rudder to place the aircraft in a coordinated turn, in the first case bringing the aircraft directly thereto from the straight flight pattern and in the second case changing the radius of the arc the aircraft is following in the turn. By a coordinated turn, we mean one in which the actual vertical axis of the aircraft coincides with the apparent vertical axis, i. e., with the resultant of the gravitational and centrifugal acceleration forces on the aircraft. Once the aircraft has been put into a coordinated turn, the pendulum then returns to the null position. The magnitude of the corrective signal is dependent upon the amount of movement of the pendulum while the polarity is dependent upon the direction of movement of the pendulum.

Also connected in the servo circuit is a follow-up or repeat-back signal source 111 which includes a potentiometer 112 connected across a voltage source 113. The potentiometer wiper arm 114 is mechanically actuated by the servomotor 95 through reduction gears 115 so that its movements correspond to those of the rudder 96. The follow-up signal appearing between wiper arm 114 and a fixed tap 116 on potentiometer 112 is variable in magnitude and polarity dependent upon the extent and direction of wiper arm 114 from coincidence with tap 116. Follow-up source 111 is connected in servo circuit so that its output signal always is of a polarity to return rudder 96 to the neutral position thereby preventing hunting of rudder 96 in the manner well known to the art.

In additional to signal sources 99, 105, and 111, there is also included in the servo circuit a rate and follow-up canceler signal source 117 which operates to substantially cancel any steady state, i. e., non-transient signals from sources 99 and 111. The canceler signal source 117 comprises a potentiometer 118 which is connected across a voltage source 119 and has a wiper arm 120 movable in either direction from a fixed tap 121. The output signal of the source is taken between arm 120 and tap 121 and is thus dependent in polarity and magnitude upon the direction and magnitude of the displacement of arm 120 from tap 121.

The position of arm 120 is determined by the position of a motor 122 which is energized from a motor control unit 123 to rotate in either direction dependent upon the polarity of the signals applied to control unit 123 and at a rate dependent upon the magnitude of the signals applied to unit 123. Control unit 123 is itself controlled by the signals appearing across points 124 and 125, which signals are the algebraic summation of the outputs of sources 99, 111 and 117. The impedance of amplifier 98 is so much greater than the impedance of the various signal sources that the signals from source 105 do not appear to any appreciable extent across points 124 and 125.

In order to make control unit 123, and thus canceler source 117, responsive to non-transient signals only, a generator 126 is included in the input circuit to control unit 118 in the manner described in the copending applications of Charles M. Young, for "Airplane Maneuvering System," Serial No. 39,346, now Patent No. 2,582,305, and for "Autopilot Control System," Serial No. 39,347, now Patent No. 2,664,530, both filed July 17, 1948, and assigned to the same assignee as the present invention. Generator 126 is placed in series with the input to motor control unit 123 so that the actual signal supplied to control unit 123 is the algebraic summation of the signal across points 124 and 125 and the output signal from generator 126.

Generator 126 is mechanically coupled with motor 122 to produce output signals varying in magnitude and polarity with the direction and rate of motor motion, and it is degeneratively electrically connected with respect to the signals across points 124 and 125; in other words, the output of generator 126 is connected in series opposition to the signal applied from points 124 and 125. Assuming that substantially steady-state signals appear across points 124 and 125, motor 122 is thereupon caused to move at a rate and in a direction dependent upon the magnitude and polarity of these signals. Motion of motor 122 not only rotates generator 126 so that it produces a signal but also displaces wiper arm 120 so that source 117 produces a signal. The resulting sequence of operation, therefore, is that motor 122 begins to move at a rate proportional to the signal across points 124 and 125, and then slows down as the outputs from generator 126 and signal source 117 oppose the actuating signal. The output from source 117 being connected serially in the servo circuit reduces the signal across points 124 and 125 while the output of generator 126 being applied in the energization circuit for control unit 123 causes only a portion of the aforesaid reduced signal to be supplied to control unit 123. When motor 122 moves arm 121 to a position where the signal output from source 117 is equal and opposite to the signal from sources 99 and 111, the signal across points 124 and 125, of course, goes to zero and the motor stops rotating. Essentially complete cancellation of steady-state signals from the follow-up source 111 and the yaw rate source 99 is thus obtained after a time interval dependent upon the original amplitude of the input signal and upon the output characteristics of source 117 and generator 126.

However, when the signals of sources 99 and 111 are varying rather rapidly, i. e., are transient signals, cancellation is negligible or very slight because of the generator output characteristics and because of the inability of the motor and associated equipment to respond to rapidly varying control signals. Consequently transient signals from sources 99 and 111 are impressed on the input of amplifier 98 much as if the rate and follow-up canceler 117 were not in the system. The reasons for including such a time element canceler source as source 117 is fully described in the aforesaid Yates application, Serial No. 240,384, and will also be discussed hereinafter in the section dealing with the interdependent action of the aileron and rudder channels.

In operation, the new and improved aileron control channel illustrated in Fig. 2a cooperates with its associated rudder channel, such as the channel illustrated in Fig. 2b, to stabilize the craft about its roll axis and to maintain the aircraft on a desired course. Now assuming that the aircraft is on course and is in a level flight position, then if a gust of wind should strike the aircraft causing it to move about its roll axis, a signal proportional to the rate of this rolling movement is introduced into the aileron channel from source 23, the signal being adjusted for the air speed of the craft by potentiometer 38 as controlled by device 45. This signal actuates motor 19 through amplifier 21 so as to displace the ailerons 18 in a direction effective to oppose the rolling movement of the aircraft. However, as the aircraft rolls, its vertical axis and the apparent vertical no longer are the same and this causes source 105 in the rudder channel to produce a signal. This signal from source 105 is fed to servomotor 95 through amplifier 98 and displaces rudder 96 so as to cause a slight turning of the aircraft about its vertical axis. As the aircraft turns about its vertical axis, sources 22 and 24 in the aileron channel then also begin to produce signals, the signal from source 22 being proportional to the azimuth deviation of the craft and the signal from source 24 being proportional to the yawing rate of the craft. The signal from source 24 is, of course, adjusted in accordance with the air speed of the craft. These signals are additive with the signal from source 23 and thereby displace ailerons 18 an additional amount in the direction necessary to return the craft to the level flight position.

The displacement of ailerons 18 continues until the signals from follow-up source 25 and tachometer 26 are equal and opposite to the control signals from sources 22, 23, and 24. Then, of course, the aileron movement ceases. By this time the aircraft is moving in the reverse direction about the roll axis back toward the level flight position, so that the control signal from source 105 in the rudder channel begins to decrease to zero. This allows the signal from the rudder follow-up source 114 to return the rudder to its null position and thereby allows the craft to again fly in a straight line.

As the craft is returning to the straight line flight, the yaw rate source 24 in the aileron channel produces a signal of the opposite polarity from that which it originally produced. This opposite polarity signal aids the follow-up signal in returning ailerons 18 to the neutral position. Moreover, as the craft starts to move about the roll axis back to the neutral position due to the displacement of ailerons 18, the roll rate source 23 also produces a signal of an opposite polarity aiding in the return of the ailerons to the neutral position. The follow-up tachometer 26, however, produces a signal opposing the return of the ailerons to the neutral position. The net result of all of these signals is that the ailerons 18 would return to the neutral position at substantially the same instant as the aircraft returned to the level flight, if the aircraft did not move off course due to the rudder displacement.

However, because of the turning action involved in returning the aircraft to the level flight position, the craft may be slightly off course when it returns to the level flight position. If this condition exists, the line of direction responsive source 22 is still producing a signal preventing ailerons 18 from returning to their neutral position. This aileron deflection then causes a slight rolling of the aircraft beyond the level flight attitude. The rolling, in turn, causes a displacement of pendulum 108 and results in source 105 producing a signal. The signal from source 105 actuates rudder 106 to return the aircraft to the correct heading. The follow-up sources in both channels, of course, oppose these actuating signals and return the ailerons and rudder respectively to their neutral position substantially at the same time as the aircraft returns to level flight on the correct course. Thus through a continuous interaction between the two channels the aircraft is held in a level flight position and in the desired azimuth heading.

Of course, in order to maintain the desired azimuth heading, there may be times at which a continuous displacement, i. e., trim, of the rudder is required. When such a trim is necessary, the follow-up source 111 produces a steady-state signal, and if nullifying means were not provided, the aircraft would fly at an angle relative to the roll axis since the pendulum source 105 would then have to supply the compensating signal necessary to stabilize the rudder in the trim position. However, due to the action of the canceler source 117, this steady-state signal from 111 is nullified, whereby the aircraft may remain in level flight. The canceler, however, does pass transient signals superimposed on the steady-state base, so that any movements of the rudder about the trim position result in actuating signals being impressed on amplifier 98. Since the canceler does pass these transient signals, the two channels operate in conjunction to maintain the craft at the desired roll attitude, as is described above, even when a trim of the rudder is required to maintain the craft on the correct heading.

As previously mentioned, we have provided in our new and improved aileron channel maneuvering control means in the form of the signal source 27. Whenever a signal is introduced into the aileron channel from source 27, the interlock circuit controlled by switch 83 operates to cage the directional gyro 32 thereby disabling source 22 and to close relay 89 thereby disabling source 24. Therefore, the maneuvering control signal causes a displacement of the ailerons unopposed by any signal source except the roll rate source 23, the follow-up signal source 25 and the follow-up rate source 26. This displacement continues until the total signal from those sources is equal and opposite to the maneuvering control signal. The ailerons then remain in that displaced position with the roll rate signal becoming substantially steady state and the follow-up rate signal going to zero. Thus to roll the aircraft at a steady rate, the pilot need only move lever 68 to introduce a signal of a particular magnitude into the aileron channel. The resulting continuous displacement of the ailerons then causes a steady rolling of the craft about its roll axis.

Such a steady rolling of the craft about its longitudinal axis is not, however, the result ordinarily desired from the maneuvering control means. Usually, the result desired is to change the course of the aircraft. To make the turn, the pilot feeds in a bias signal from source 27 for a short time until the aircraft is moved to a certain attitude relative to the roll axis. The pilot then removes the bias signal allowing the follow-up roll rate sources to return the ailerons to their neutral position. The aircraft, however, does not return to level flight but holds this bank angle due to its aerodynamic characteristics. The ailerons do not move past the neutral position because with the aircraft in a steady bank angle, the roll rate signal goes to zero. With the aircraft in this bank angle, the pendulum 108 moves off its null position so as to cause source 105 to produce a signal. The signal from source 105, of course, causes a displacement of rudder 96 and puts the plane in a turn. The sharpness of this turn increases until such a time as pendulum 108 returns to the neutral position, which turn is, of course, the aforesaid coordinated turn. Now since this is a steady turn, the yaw rate gyro 100 is producing a steady-state signal and since rudder 96 is continuously displaced, the follow-up source 111 is also producing a steady-state signal. If allowed to reach the servo amplifier 98, these signals would, of course, cause an error in the desired rudder position. However, canceler 117 nullifies these steady-state signals, so that the pendulum controlled source 105 keeps the aircraft in the coordinated turn. In some types of aircraft, once the plane is in such a coordinated turn, a continuing displacement of the rudder is not necessary. In such craft, the follow-up source 111 will return the rudder to the null position and the canceler source 117 will then have to nullify only the steady-state signal from yaw rate source 94.

To bring the plane out of this turn, a bias signal of the opposite polarity is introduced into the aileron channel from source 27. This causes a displacement of the ailerons in the reverse direction and returns the plane to a straight flight position. If the rudder is still displaced from its neutral position as the plane moves from the bank position to the straight flight position, it causes sideslipping of the craft and results in the pendulum leaving its null position. This causes a movement of the rudder back toward its normal position so that the rudder reaches this normal position substantially at the same time as the craft returns to level flight. In many types of aircraft, however, the rudder is not continuously displaced during the turn, as mentioned above, and in such aircraft, no new signals will be introduced in the rudder channel. In either case as the craft moves back into straight flight from the turn, the signal from the yaw rate source gradually goes to zero. As the signal from the yaw rate source goes to zero, the signal from the canceler also goes to zero so that there is no actuating signal fed to the servo.

Thus by our invention, we have provided a new and improved lightweight autopilot apparatus effective not only to stabilize the aircraft about its roll axis but also to maneuver it thereabout upon manual actuation by the human pilot. Our new and improved aileron channel, since it does not require a vertical gyro controlled source, is much lighter than conventional high performance aileron channels and thereby allows a considerable saving in the overall weight of the autopilot. Our new and improved aileron channels may be used with any elevator control channels which are both electrically and aerodynamically independent of the associated rudder and aileron channels, but for the greatest weight saving, our aileron channels should be used with elevator channels in which the need for a vertical gyro is also obviated. A maneuvering autopilot elevator control channel particularly well adapted for use with the maneuvering aileron control channel of Fig. 2a is illustrated and described in the aforesaid Yates application Serial No. 256,167. Moreover, as mentioned hereinbefore, it is to be understood that our invention is not limited to the particular types of rudder channels shown herein, but may be used with any other rudder channels which will cooperate aerodynamically with our aileron channels to produce the desired results.

While the various signal sources included in the servo circuits have been illustrated and described as potentiometer-type sources, they have been so depicted primarily for the sake of clearness in understanding the invention, and it will be readily appreciated that selsyn-type inductive instruments such as those shown in Patent 2,464,629—Young may be substituted for the potentiometers if desired. When potentiometers are used, the voltage sources shown may be D. C. or A. C. and in practice a common source connected to each potentiometer through a transformer would be used if A. C. sources were employed.

Thus, while in accordance with the patent statutes, we have described what at present are considered to be the preferred embodiments of our invention, it will be obvious to those skilled in the art that numerous alterations and modifications may be made therein without departing from the invention, and it is, therefore, aimed in the appended claims to cover all such equivalent variations as fall within the true spirit and scope of this invention.

What we claim as new and desire to secure by Letters Patent of the United States is:

1. In a control system for an aircraft having a movable control surface arranged to turn said craft about one co-ordinate axis thereof, signal responsive actuating means connected to move said surface, means for generating a signal proportional to the rate of movement of said craft about said one axis, means for generating a signal proportional to the rate of movement of said craft about a second co-ordinate axis thereof perpendicular to said one axis, means for generating a signal proportional to the deviation of said craft from a desired attitude relative to said second axis, means for generating a signal in response to the displacement of said control surface from a predetermined normal position, and means coupling said signals to energize said actuating means.

2. In a control system for an aircraft having a movable control surface arranged to turn said craft about one co-ordinate axis thereof, signal responsive actuating means connected to move said surface, means for generating a signal proportional to the rate of movement of said craft about said one axis, means for generating a signal proportional to the rate of movement of said craft about a second co-ordinate axis thereof perpendicular to said one axis, means for generating a signal proportional to the deviation of said craft from a desired attitude relative to said second axis, means for generating a signal proportional to the displacement of said surface from a predetermined normal position, means for generating a signal proportional to the rate of movement of said surface, and means coupling said signals to energize said actuating means.

3. In a control system for an aircraft having an aileron control surface arranged to turn said craft about the roll axis thereof, aileron control apparatus comprising signal responsive actuating means connected to move said surface, means for generating a signal proportional to the rate of movement of said craft about said roll axis, means for generating a signal proportional to the rate of movement of said craft about the yaw axis thereof, means for generating a signal proportional to the deviation of said craft from a desired direction of flight, means for generating a signal in response to the displacement of said surface from a predetermined normal position, and means coupling said signals to energize said actuating means.

4. In a control system for a craft having an aileron control surface arranged to turn said craft about the roll axis thereof, aileron control apparatus comprising signal responsive actuating means connected to move said surface, means for generating a signal proportional to the rate of movement of said craft about said roll axis, means for generating a signal proportional to the rate of movement of said craft about the yaw axis thereof, means for generating a signal proportional to deviation of said craft from a desired direction of flight, means for generating a signal proportional to the displacement of said surface from a predetermined normal position, means for generating a signal proportional to the rate of movement of said surface, and means coupling said signals to energize said actuating means.

5. In a control system for an aircraft having movable rudder and aileron control surfaces arranged respectively to maneuver said craft about the yaw and roll axes thereof, and including rudder control apparatus having signal responsive actuating means connected to move said rudder control surface and signal producing means responsive to the departure of the apparent vertical of said craft from the true vertical thereof coupled to energize said actuating means, aileron control apparatus comprising signal responsive actuating means connected to move said aileron control surface, means for producing a signal proportional to the rate of movement of said craft about said roll axis, means for producing a signal proportional to the rate of movement of said craft about said yaw axis, means for producing a signal proportional to the azimuth deviation of said craft from a desired course, means for producing a signal in response to the displacement of said aileron control surface from a predetermined normal position, and means coupling said signals to energize said last-named actuating means.

6. In a control system for an aircraft having movable rudder and aileron control surfaces arranged respectively to maneuver said craft about the yaw and roll axes thereof, rudder control apparatus including first signal responsive actuating means connected to move said rudder control surface and signal producing means responsive to the departure of the apparent vertical of said craft from the true vertical thereof coupled to energize said actuating means, aileron control apparatus comprising second signal responsive actuating means connected to move said aileron control surface, means for producing a signal proportional to the rate of movement of said craft about said roll axis, means for producing a signal proportional to the rate of movement of said craft about said yaw axis, means for producing a signal proportional to the azimuth deviation of said craft from a desired course, means for producing a signal proportional to the displacement of said aileron control surface from a predetermined normal position, means for producing a signal proportional to the rate of movement of said aileron control surface, and means coupling said signals to energize said second actuating means.

7. Automatic pilot apparatus for an aircraft having movable rudder and aileron control surfaces arranged respectively to maneuver said craft about the yaw and roll axes thereof comprising, a rudder control channel including first signal responsive actuating means connected to move said rudder control surface, means for producing a bank attitude signal in response to the departure of the apparent vertical of said craft from the true vertical thereof, means for producing a rudder follow-up signal in response to the displacement of said rudder control surface from a present normal position, means coupling said bank attitude and rudder follow-up signals to energize said first actuating means, an aileron control channel including second signal responsive actuating means connected to move said aileron control surface, means for generating a roll rate signal proportional to the rate of movement of said craft about said roll axis, means for generating a yaw rate signal proportional to the rate of movement of said craft about said yaw axis, means for generating an azimuth deviation signal proportional to the departure of said craft from a desired direction of flight, means for generating an aileron follow-up signal in response to the displacement of said surface from a predetermined normal position, and means coupling said roll rate, yaw rate, azimuth deviation, and aileron follow-up signals to energize said second actuating means whereby said craft is stabilized about its roll axis and maintained in said desired direction of flight through aerodynamic reaction between said aileron and rudder control channels.

8. Automatic pilot apparatus for an aircraft having movable rudder and aileron control surfaces arranged respectively to maneuver said craft about the yaw and roll axes thereof comprising, a rudder control channel including first signal responsive actuating means connected to move said rudder control surface, means for producing a bank attitude signal in response to the departure of the apparent vertical of said craft from the true vertical thereof, means for producing a rudder follow-up signal response to the displacement of said rudder control surface from a present normal position, means coupling said bank attitude and rudder follow-up signals to energize said first actuating means, an aileron channel including second signal responsive actuating means connected to move said aileron control surface, means for generating a roll rate signal proportional to the rate of movement of said craft about said roll axis, means for generating a yaw rate signal proportional to the rate of movement of said craft about said yaw axis, means for generating an azimuth deviation signal proportional to the departure of said craft from a desired direction of flight, means for generating an aileron follow-up signal proportional to the displacement of said surface from a predetermined normal position, means for generating an aileron rate signal proportional to the rate of movement of said aileron control surface and means coupling said yaw rate, roll rate, azimuth deviation, aileron follow-up and aileron rate signals to energize said second actuating means whereby said craft is stabilized about its roll axis and maintained in said desired direction of flight through aerodynamic reaction between said aileron and rudder control channels.

9. In a maneuvering control system for a craft having movable rudder and aileron control surfaces arranged respectively to maneuver said craft about the yaw and roll axes thereof, rudder control apparatus including first signal responsive actuating means connected to move said rudder control surface and signal producing means responsive to the departure of the apparent vertical of said craft from the true vertical thereof coupled to energize said actuating means, aileron control apparatus comprising second signal responsive actuating means connected to move said aileron control surface, a roll rate signal generating means for producing a roll rate signal proportional to the rate of movement of said craft about said roll axis, a yaw rate signal generating means for producing a signal proportional to the rate of movement of said craft about said yaw axis, an azimuth deviation signal generating means for producing a signal proportional to the departure of said craft from a desired line of flight, a follow-up signal generating means for producing a signal in response to the displacement of said aileron control surface from a predetermined normal position, a manually actuated signal generating means for producing a maneuvering control signal, means coupling said signals to energize said second actuating means, and means interlocked with said manually actuated means for disabling said yaw rate means and said azimuth deviation means whenever said manually actuated means is producing a signal, thereby to allow said manually actuated means to cause coordinating turning of said craft.

10. In a maneuvering control system for a craft having movable rudder and aileron control surfaces arranged respectively to maneuver said craft about the yaw and roll axes thereof, rudder control apparatus including first signal responsive actuating means connected to move said control surface and signal generating means responsive to the departure of the apparent vertical of said craft from the true vertical thereof coupled to energize said first actuating means, aileron control apparatus comprising second signal responsive actuating means connected to move said aileron control surface, a roll rate signal generating means for producing a signal proportional to the rate of movement of said craft about said roll axis, a yaw rate signal generating means for producing a signal proportional to the rate of movement of said craft about said yaw axis, an azimuth deviation signal generating means for producing a signal proportional to the departure of said craft from a desired direction of flight, a follow-up signal generating means including means for producing a signal proportional to the displacement of said aileron control surface from a predetermined normal position and means for producing a signal proportional to the rate of movement of said aileron control surface, a manually actuated signal generating means for producing a maneuvering control signal, means coupling said signals to energize said second actuating means and means interlocked with said manually actuated means for disabling said yaw rate means and said azimuth deviation means whenever said manually actuated means is producing a signal, thereby to allow said manually actuated means to cause co-ordinated turning of said craft.

11. In a control system for an aircraft having a movable control surface arranged to turn said craft about one co-ordinate axis thereof, a servomotor connected to move said surface, means for generating a first signal proportional to the rate of movement of said craft about said one axis, means for generating a second signal proportional to the rate of movement of said craft about a second co-ordinate axis thereof perpendicular to said one axis, means for generating a third signal proportional to the deviation of said craft from a desired attitude relative to said second axis, means for generating a fourth signal in response to the displacement of said control surface from a predetermined normal position, means for adjusting the magnitudes of said first and second signals in accordance with a function of the speed of flight of said craft, and means coupling the adjusted first and second signals and said third and fourth signals to actuate said servomotor.

12. In a control system for an aircraft having a movable control surface arranged to turn said craft about one co-ordinate axis thereof, a servomotor connected to move said surface, means for generating a first signal proportional to the rate of movement of said craft about said one axis, means for generating a second signal proportional to the rate of movement of said craft about a second co-ordinate axis thereof perpendicular to said one axis, means for generating a third signal proportional to the deviation of said craft from a desired attitude relative to said second axis, means for generating a fourth signal proportional to the displacement of said surface from a predetermined normal position, means for generating a fifth signal proportional to the rate of movement of said surface, means for adjusting the magnitudes of said first and second signals in accordance with the speed of flight of said craft, and means coupling the adjusted first and second signals and said third, fourth and fifth signals to actuate said servomotor.

13. In a control system for an aircraft having an aileron control surface arranged to turn said craft about the roll axis thereof, aileron control apparatus comprising a servomotor connected to move said surface, means for generating a roll rate signal proportional to the rate of movement of said craft about said roll axis, means for generating a yaw rate signal proportional to the rate of movement of said craft about the yaw axis thereof, means for generating an azimuth deviation signal proportional to the deviation of said craft from a desired direction of flight, means for generating a follow-up signal in response to the displacement of said surface from a predetermined normal position, means for adjusting the magnitudes of the yaw rate and roll rate signals in accordance with a function of the speed of flight of said craft, and means coupling the adjusted roll rate and yaw rate signals and said azimuth deviation and follow-up signals to actuate said servomotor.

14. In a control system for an aircraft having an aileron control surface arranged to turn said craft about the roll axis thereof, aileron control apparatus comprising a servomotor connected to move said surface, means for generating a roll rate signal proportional to the rate of movement of said craft about said roll axis, means for generating a yaw rate signal proportional to the rate of movement of said craft about the yaw axis thereof, means for generating an azimuth deviation signal proportional to deviation of said craft from a desired direction of flight, means for generating a follow-up signal proportional to the displacement of said surface from a predetermined normal position, means for generating an aileron rate signal proportional to the rate of movement of said surface, means for adjusting the magnitudes of said roll rate and yaw rate signals in accordance with a function of the speed of flight of said craft, and means coupling the adjusted roll rate and yaw rate signals and said azimuth deviation, follow-up and aileron rate signals to actuate said servomotor.

15. In a control system for an aircraft having movable rudder and aileron control surfaces arranged respectively to maneuver said craft about the yaw and roll axes thereof, rudder control apparatus including a first servomotor connected to move said rudder control surface and signal producing means responsive to the departure of the apparent vertical of said craft from the true vertical thereof coupled to actuate said first servomotor, aileron control apparatus comprising a second servomotor connected to move said aileron control surface, means for producing a roll rate signal proportional to the rate of movement of said craft about said roll axis, means for producing a yaw rate signal proportional to the rate of movement of said craft about said yaw axis, means for producing an azimuth deviation signal proportional to the azimuth deviation of said craft from a desired source, means for producing a follow-up signal in response to the displacement of said aileron control surface from a predetermined normal position, means for adjusting the magnitudes of said yaw rate and roll rate signals in accordance with a function of the speed of flight of said craft, and means coupling the adjusted yaw rate and roll rate signals and said azimuth deviation and said follow-up signals to actuate said second servomotor.

16. In a control system for an aircraft having movable rudder and aileron control surfaces arranged respectively to maneuver said craft about the yaw and roll axes thereof, rudder control apparatus including a first servomotor connected to move said rudder control surface and signal producing means responsive to the departure of the apparent vertical of said craft from the true vertical thereof coupled to actuate said first servomotor, aileron control apparatus comprising a second servomotor connected to move said aileron control surface, means for producing a roll rate signal proportional to the rate of movement of said craft about said roll axis, means for producing a yaw rate signal proportional to the rate of movement of said craft about said yaw axis, means for producing an azimuth deviation signal proportional to the azimuth deviation of said craft from a desired course, means for producing a follow-up signal proportional to the displacement of said aileron control surface from a predetermined normal position, means for producting an aileron rate signal proportional to the rate of movement of said aileron control surface, means for adjusting the magnitudes of said roll rate and yaw rate signals in accordance with a function of the speed of flight of said craft, and means coupling the adjusted roll rate and yaw rate signals and said azimuth deviation, follow-up and aileron rate signals to actuate said second servomotor.

17. Automatic pilot apparatus for an aircraft having movable rudder and aileron control surfaces arranged respectively to maneuver said craft about the yaw and roll axes thereof, comprising a rudder control channel including a first servomotor connected to move said rudder control surface, means for producing a bank attitude signal in response to the departure of the apparent vertical of said craft from the true vertical thereof, means for producing a rudder follow-up signal in response to the displacement of said rudder control surface from a present normal position, means coupling said bank attitude and rudder follow-up signals to energize said first servomotor, an aileron control channel including a second servomotor connected to move said aileron control surface, means for generating a roll rate signal proportional to the rate of movement of said craft about said roll axis, means for generating a yaw rate signal proportional to the rate of movement of said craft about said yaw axis, means for generating an azimuth deviation signal proportional to the departure of said craft from a desired direction of flight, means for generating an aileron follow-up signal in response to the displacement of said surface from a predetermined normal position, means for adjusting the magnitude of said roll rate and yaw rate signals in accordance with a function of the speed of flight of said craft, and means coupling the adjusted roll rate and yaw rate signals and said azimuth deviation and aileron follow-up signals to actuate said second servomotor whereby said craft is stabilized about its roll axis and maintained in said desired direction of flight through aerodynamic reaction between said aileron and rudder control channels.

18. Automatic pilot apparatus for an aircraft having movable rudder and aileron control surfaces arranged respectively to maneuver said craft about the yaw and roll axes thereof comprising a rudder control channel including a first servomotor connected to move said rudder control surface, means for producing a bank attitude signal in response to the departure of the apparent vertical of said craft from the true vertical thereof, means for producing a rudder follow-up signal in response to the displacement of said rudder control surface from a present normal position, means coupling said bank attitude and rudder follow-up signals to energize said first servomotor, an aileron channel including a second servomotor connected to move said aileron control surface, means for generating a roll rate signal proportional to the rate of movement of said craft about said roll axis, means for generating a yaw rate signal proportional to the rate of movement of said craft about said yaw axis, means for generating an azimuth deviation signal proportional to the departure of said craft from a desired direction of flight, means for generating an aileron follow-up signal proportional to the displacement of said surface from a predetermined normal position, means for generating an aileron rate signal proportional to the rate of movement of said aileron control surface, means for adjusting the magnitudes of said roll rate and yaw rate signals in accordance with a function of the speed of flight of said craft, and means coupling the adjusted roll rate and yaw rate signals and said azimuth deviation, aileron follow-up, and aileron rate signals to actuate said second servomotor, whereby said craft is stabilized about its pitch axis and maintained in said desired direction of flight through aerodynamic reaction between said aileron and rudder control channels.

19. In a maneuvering control system for a craft having movable rudder and aileron control surfaces arranged respectively to maneuver said craft about the yaw and roll axes thereof, rudder control apparatus including a first servomotor connected to move said rudder control surface and signal producing means responsive to the departure of the apparent vertical of said craft from the true vertical thereof coupled to actuate said first servomotor, aileron control apparatus comprising a second servomotor connected to move said aileron control surface, a roll rate signal generating means for producing a roll rate signal proportional to the rate of movement of said craft about said roll axis, a yaw rate signal generating means for producing a yaw rate signal proportional to the rate of movement of said craft about said yaw axis, an azimuth deviation signal generating means for producing an azimuth deviation signal proportional to the departure of said craft from a desired line of flight, a follow-up signal generating means for producing a follow-up signal in response to the displacement of said aileron control surface from a predetermined normal position, a manually actuated signal generating means for producing a maneuvering control signal, means for adjusting the magnitudes of said roll rate and yaw rate signals in accordance with a function of the speed of flight of said craft, means coupling the adjusted yaw rate and roll rate signals and said azimuth deviation, follow-up and maneuvering control signals to actuate said second servomotor, and means interlocked with said manually actuated means for disabling said yaw rate means and said azimuth deviation means whenever said manually actuated means is producing a signal, thereby to allow said manually actuated means to cause co-ordinating turning of said craft.

20. In a maneuvering control system for a craft having movable rudder and aileron control surfaces arranged respectively to maneuver said craft about the yaw and roll axes thereof, a rudder control apparatus including a first servomotor connected to move said control surface and signal generating means responsive to the departure of the apparent vertical of said craft from the true vertical thereof coupled to actuate said first servomotor, aileron control apparatus comprising a second servomotor connected to move said aileron control surface, a roll rate signal generating means for producing a roll rate signal proportional to the rate of movement of said craft about said roll axis, a yaw rate signal generating means for producing a yaw rate signal proportional to the rate of movement of said craft about said yaw axis, an azimuth deviation generating means for producing an azimuth deviation signal proportional to the departure of said craft from a desired direction of flight, a follow-up signal generating means including means for producing a follow-up signal proportional to the displacement of said aileron control surface from a predetermined normal position and means for producing an aileron rate signal proportional to the rate of movement of said aileron control surface, a manually actuated signal generating means for producing a maneuvering control signal, means for adjusting said roll rate and yaw rate signals in accordance with a function of the speed of said craft, means coupling the adjusted roll rate and yaw rate signals and said azimuth deviation maneuvering control, follow-up and aileron rate signals to actuate said second servomotor, and means interlocked with said manually controlled means for disabling said yaw rate means and said azimuth deviation means whenever said manually actuated means is producing a signal, thereby to allow said manually actuated means to cause co-ordinating turning of said craft.

21. Automatic pilot apparatus for an aircraft having a pair of control surfaces each arranged to maneuver said craft about separate co-ordinate axes thereof comprising, a first control channel including first signal responsive actuating means connected to move one of said surfaces, means for producing a first signal proportional to the deviation of said craft from a desired attitude relative to one of said co-ordinate axes, means for producing a second signal in response to the displacement of said one surface from a predetermined position and means coupling said first and second signals to energize said first actuating means; a second control channel including second signal responsive actuating means for moving the other of said surfaces, means for producing a third signal proportional to the rate of movement of said craft about said one axis, means for producing a fourth signal proportional to the rate of movement of said craft about the other of said co-ordinate axis, means for producing a fifth signal proportional to the deviation of said craft from a desired attitude relative to said other axis, means for producing a sixth signal in response to the displacement of the other of said control surfaces from a predetermined normal position, and means coupling said third, fourth, fifth and sixth signals to actuate said second signal responsive actuating means.

22. In a control system for an aircraft having a movable control surface arranged to turn said craft about one co-ordinate axis thereof, a servomotor connected to move said surface, means for generating a signal proportional to the rate of movement of said craft about said one axis, means for generating a signal proportional to the rate of movement of said craft about a second co-ordinate axis thereof perpendicular to said one axis, means for generating a signal proportional to the deviation of said craft from a desired attitude relative to said second axis, means for generating a signal in response to the displacement of said surface from a null position, manually controlled means for producing a signal, and means coupling said signals to actuate said servomotor.

23. In a control system for an aircraft having a movable control surface arranged to turn said craft about one co-ordinate axis thereof, a servomotor connected to move said surface, means for generating a signal proportional to the rate of movement of said craft about said one axis, means for generating a signal proportional to the rate of movement of said craft about a second co-ordinate axis thereof perpendicular to said one axis, means for generating a signal proportional to the deviation of said craft from a desired attitude relative to said second axis, means for generating a signal proportional to the displacement of said surface from a predetermined normal position, means for generating a signal proportional to the rate of movement of said surface, manually controlled means for producing a signal, and means coupling said signals to actuate said servomotor.

24. In a control system for an aircraft having an aileron control surface arranged to turn said craft about the roll axis thereof, aileron control apparatus comprising a servomotor connected to move said surface, roll rate means for generating a roll rate signal proportional to the rate of movement of said craft about said roll axis, yaw rate means for generating a yaw rate signal proportional to the rate of movement of said craft about the yaw axis thereof, azimuth deviation means for generating an azimuth deviation signal proportional to the departure of said craft from a desired direction of flight, follow-up means for generating a follow-up signal in response to the displacement of said surface from a null position, manually controlled means for generating a maneuvering control signal, means for adjusting the magnitudes of said roll rate and yaw rate signals in accordance with the speed of flight of said craft, means coupling the adjusted yaw rate and roll rate signals and said azimuth deviation, maneuvering control and follow-up signals to actuate said servomotor, and means for disabling said yaw rate means and said azimuth deviation means in response to signal generating actuation of said manually controlled means.

25. In a control system for an aircraft having an aileron control surface arranged to turn said craft about the roll axis thereof, aileron control apparatus comprising a servomotor connected to move said surface, roll rate means for generating a roll rate signal proportional to the rate of movement of said craft about said roll axis, yaw rate means for generating a signal proportional to the rate of movement of said craft about the yaw axis thereof, azimuth deviation means for generating an azimuth deviation signal proportional to the departure of said craft from a desired direction of flight, follow-up means for generating a follow-up signal proportional to the displacement of said surface from a null position, aileron rate means for generating an aileron rate signal proportional to the rate of movement of said surface, manually controlled means for producing a maneuvering control signal, means for adjusting the magnitudes of said roll rate and yaw rate signals in accordance with a function of the speed of flight of said craft, means coupling the adjusted roll rate and yaw rate signals and said azimuth deviation maneuvering control, follow-up and aileron rate signals to actuate said servomotor, and means interlocked with said manually controlled means for disabling said azimuth deviation means and said yaw rate means in response to signal generating actuation of said maneuvering control means.

26. In a control system for an aircraft having an aileron control surface arranged to turn said craft about the roll axis thereof, aileron control apparatus comprising a servomotor connected to move said surface, roll rate means for generating a signal proportional to the rate of movement of said craft about said roll axis, yaw rate means for generating a signal proportional to the rate of movement of said craft about the yaw axis thereof, azimuth deviation means for generating a signal proportional to the departure of said craft from a desired direction of flight, follow-up means for generating a signal in response to the displacement of said surface from a null position, manually controlled means for producing a maneuvering control signal, means coupling said signals to energize said servomotor, and means interlocked with said manually controlled means for disabling said azimuth deviation means and said yaw rate means whenever said manually controlled means is actuated to produce a signal.

27. In a control system for an aircraft having an aileron control surface arranged to turn said craft about the roll axis thereof, aileron control apparatus comprising a servomotor connected to move said surface, roll rate means for generating a signal proportional to the rate of movement of said craft about said roll axis, yaw rate means for generating a signal proportional to the rate of movement of said craft about the yaw axis thereof, azimuth deviation means for generating a signal proportional to the departure of said craft from a desired direction of flight, follow-up means for generating a signal proportional to the displacement of said surface from a null position, aileron rate means for generating a signal proportional to the rate of movement of said surface, manually controlled means for generating a maneuvering control signal, means coupling said signals to energize said servomotor, and means interlocked with said manually controlled means for disabling said azimuth deviation means and said yaw rate means whenever said manually controlled means is actuated to produce a signal.

28. Maneuvering automatic pilot apparatus for an aircraft having movable rudder and aileron control surfaces arranged to maneuver said craft about the yaw and roll axes thereof comprising, a rudder control channel including a first servomotor connected to move said rudder control surface, means for producing a bank attitude responsive signal in response to the departure of the apparent vertical of said craft from the true vertical thereof, means for producing a rudder follow-up signal in response to the displacement of said rudder control surface from a predetermined position, means coupling said bank attitude and rudder follow-up signals to energize said first servomotor, an aileron control channel including a second servomotor connected to move said aileron control surface, roll rate means for generating a roll rate signal proportional to the rate of movement of said craft about said roll axis, yaw rate means for generating a yaw rate signal proportional to the rate of movement of said craft about said yaw axis, azimuth deviation means for generating an azimuth deviation signal proportional to the departure of said craft from a desired direction of flight, follow-up means for generating an aileron follow-up signal in response to the displacement of said aileron control surface from a predetermined normal position, manually controlled means for producing a maneuvering control signal, means coupling said roll rate, yaw rate, azimuth deviation, maneuvering control and aileron follow-up signals to actuate said second servomotor, and means interlocked with said manually controlled means for disabling said azimuth deviation means and said yaw rate means in response to actuation of said manually controlled means to produce a signal, thereby allowing said manually controlled means to cause co-ordinated turning of said craft through aerodynamic reaction between said channels.

29. Maneuvering automatic pilot apparatus for an aircraft having movable rudder and aileron control surfaces arranged to maneuver said craft about the yaw and roll axes thereof comprising, a rudder control channel including a first servomotor connected to move said rudder control surface, means for producing a bank attitude signal in response to the departure of the apparent vertical of said craft from the true vertical thereof, means for producing a rudder follow-up signal proportional to the displacement of said rudder control surface from a predeterminal normal position, means coupling said bank attitude and rudder follow-up signals to energize said first servomotor, an aileron channel including a second servomotor connected to move said aileron control surface, roll rate means for generating a roll rate signal proportional to the rate of movement of said craft about said roll axis, yaw rate means for generating a yaw rate signal proportional to the rate of movement of said craft about said yaw axis, azimuth deviation means for generating an azimuth deviation signal proportional to the deviation of said craft from a desired direction of flight, follow-up means for generating an aileron follow-up signal proportional to the displacement of said surface from a null position, aileron rate means for generating an aileron rate signal proportional to the rate of movement of said aileron control surface, manually controlled means for producing a maneuvering control signal, means coupling said roll rate, yaw rate, azimuth deviation, maneuvering control, aileron follow-up and aileron rate signals to actuate said second servomotor, and means interlocked with said manually controlled means for disabling said azimuth deviation means and said yaw rate means in response to actuation of said manually controlled means to produce a signal, whereby said manually controlled means effects co-ordinated turning of said craft through aerodynamic reaction between said channels.

30. Maneuvering automatic pilot apparatus for an aircraft having movable rudder and aileron control surfaces arranged to maneuver said craft about the yaw and roll axes thereof comprising, a rudder control channel including a first servomotor connected to move said rudder control surface, means for producing a bank attitude responsive signal in response to the departure of the apparent vertical of said craft from the true vertical thereof, means for producing a rudder follow-up signal in response to the displacement of said rudder control surface from a predetermined normal position, means coupling said bank attitude and rudder follow-up signals to energize said first servomotor, an aileron control channel including a second servomotor connected to move said aileron control surface, roll rate means for generating a roll rate signal proportional to the rate of movement of said craft about said roll axis, yaw rate means for generating a yaw rate signal proportional to the rate of movement of said craft about said yaw axis, azimuth deviation means for generating an azimuth deviation signal proportional to the departure of said craft from a desired direction of flight, follow-up means for generating a follow-up signal in response to the displacement of said surface from a predetermined normal position, manually controlled means for producing a maneuvering control signal, means for adjusting the magnitudes of said roll rate and yaw rate signals in accordance with a function of the speed of flight of said craft, means coupling the adjusted roll rate and yaw rate signals and said azimuth deviation, maneuvering control and follow-up signals to actuate said second servomotor, and means interlocked with said manually controlled means for disabling said azimuth deviation means and said yaw rate means in response to actuation of said manually controlled means to produce a signal, whereby said manually controlled means effects co-ordinated turning of said craft through aerodynamic interaction between said channels.

31. Maneuvering automatic pilot apparatus for an aircraft having movable rudder and aileron control surfaces arranged to maneuver said craft about the yaw and roll axes thereof comprising, a rudder control channel including a first servomotor connected to move said rudder control surface, means for producing a bank attitude signal in response to the departure of the apparent vertical of said craft from the true vertical thereof, means for producing a rudder follow-up signal proportional to the displacement of said rudder control surface from a predetermined normal position, means coupling said bank attitude and rudder follow-up signals to energize said first servomotor, an aileron channel including a second servomotor connected to move said aileron control surface, roll rate means for generating a roll rate signal proportional to the rate of movement of said craft about said roll axis, yaw rate means for generating a yaw rate signal proportional to the rate of movement of said craft about said yaw axis, azimuth deviation means for generating an azimuth deviation signal proportional to the deviation of said craft from a desired direction of flight, aileron follow-up means for generating an aileron follow-up signal proportional to the displacement of said surface from a null position, aileron rate means for generating an aileron rate signal proportional to the rate of movement of said aileron control surface, manually controlled means for generating a maneuvering control signal, means for adjusting the magnitudes of said roll rate and yaw rate signals in accordance with a function of the speed of flight of said craft, means coupling the adjusted roll rate and yaw rate signals and said azimuth deviation, aileron follow-up, aileron rate and maneuvering control signals to actuate said second servomotor, and means interlocked with said manually controlled means for disabling said yaw rate means and said azimuth deviation means in response to actuation of said manually controlled means to produce a signal, whereby said manually controlled means effects coordinated turning of said craft through aerodynamic reaction between said channels.

No references cited.